United States Patent
Aoki et al.

(10) Patent No.: US 9,699,372 B2
(45) Date of Patent: Jul. 4, 2017

(54) IMAGING DEVICE AND FOCUSING CONTROL METHOD

(71) Applicant: FUJIFILM Corporation, Tokyo (JP)

(72) Inventors: Takashi Aoki, Saitama (JP); Yasuo Ohtsuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/233,079

(22) Filed: Aug. 10, 2016

(65) Prior Publication Data

US 2016/0353009 A1 Dec. 1, 2016

Related U.S. Application Data

(63) Continuation of application No. PCT/JP2015/050350, filed on Jan. 8, 2015.

(30) Foreign Application Priority Data

Mar. 25, 2014 (JP) ................................. 2014-062191

(51) Int. Cl.
*H04N 5/232* (2006.01)
*G02B 7/34* (2006.01)
*H04N 5/369* (2011.01)

(52) U.S. Cl.
CPC .......... *H04N 5/23212* (2013.01); *G02B 7/34* (2013.01); *H04N 5/3696* (2013.01)

(58) Field of Classification Search
CPC ................................................ H04N 5/23212
USPC ....................................... 348/345, 349, 350
See application file for complete search history.

(56) References Cited

U.S. PATENT DOCUMENTS

| | | | | |
|---|---|---|---|---|
| 8,212,917 B2 * | 7/2012 | Amano | ................... | G02B 7/34 348/350 |
| 2015/0281556 A1 * | 10/2015 | Hamano | ................. | G02B 7/34 348/353 |
| 2016/0198107 A1 * | 7/2016 | Yamazaki | ................ | G02B 7/38 348/350 |

FOREIGN PATENT DOCUMENTS

| | | |
|---|---|---|
| JP | 2008-216719 A | 9/2008 |
| JP | 2013-190734 A | 9/2013 |

OTHER PUBLICATIONS

English Translation of Written Opinion of the International Searching Authority, issued in PCT/JP2015/050350 dated Apr. 7, 2015.

(Continued)

*Primary Examiner* — Anthony J Daniels
(74) *Attorney, Agent, or Firm* — Birch, Stewart, Kolasch & Birch, LLP

(57) ABSTRACT

A phase difference AF processing unit (19) calculates, through an operation using a detection signal group SA of phase difference detection pixels (52A) in an AF area (53), a detection signal group SB of phase difference detection pixels (52B), and a detection signal group SN of G pixels 51 in a row between a row including the phase difference detection pixels (52A) and a row including the phase difference detection pixels (52B), a third correlation value corresponding to a value obtained by adding up a first correlation value between the detection signal group SA and the detection signal group SN and a second correlation value between the detection signal group SB and the detection signal group SN, and generates a defocus amount Df1 from the third correlation value. A system control unit (11) drives a focus lens based on the defocus amount Df1.

10 Claims, 14 Drawing Sheets

(56) References Cited

OTHER PUBLICATIONS

International Search Report, issued in PCT/JP2015/050350, PCT/ISA/210, dated Apr. 7, 2015.
Written Opinion of the International Searching Authority, issued in PCT/JP2015/050350, PCT/ISA/237, dated Apr. 7, 2015.

* cited by examiner

IMAGING DEVICE AND FOCUSING CONTROL METHOD

CROSS-REFERENCE TO RELATED APPLICATIONS

This application is a Continuation of PCT International Application No. PCT/JP2015/050350 filed on Jan. 8, 2015, which claims priority under 35 U.S.C. §119(a) to Japanese Patent Application No. 2014-062191 filed on Mar. 25, 2014. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to the increase in resolution of an imaging element such as a charge coupled device (CCD) image sensor or a complementary metal oxide semiconductor (CMOS) image sensor, demand for electronic apparatuses having an imaging function, such as a digital still camera, a digital video camera, or a mobile phone such as a smart phone, has rapidly increased. Such an electronic apparatus having an imaging function is referred to as an imaging device.

In such an imaging device, as a focusing control method for focusing on a main subject, a phase difference auto-focus (AF) method (for example, see JP2013-190734A) is employed.

A focusing control based on the phase difference AF method is performed using an imaging element having a configuration in which pairs of phase difference detection pixels that receive one of a pair of beams passing through different parts of a pupil region of an imaging optical system and phase difference detection pixels that receive the other one of the pair of beams are discretely arranged on an imaging surface. In general, a correlation operation of detection signals is performed between the pairs of the phase difference detection pixels, a defocus amount is generated from a result of the correlation operation, and a focusing control is performed based on the defocus amount.

In JP2013-190734A, there is a problem that when an imaging element in which pairs of phase difference detection pixels are arranged at the same row is used, a focusing detection is not easily performed in a case where there is an edge that crosses a phase difference detection direction. Further, in order to solve the problem, JP2013-190734A discloses a technique for generating a defocus amount from results obtained by performing a correlation operation with respect to one of the pair of phase difference detection pixels and imaging pixels that receive both of the pair of beams in an upper adjacent row and in a lower adjacent row with reference to a row including the one of the pair of phase difference detection pixels, respectively, and performing a focusing control based on the defocus amount.

SUMMARY OF THE INVENTION

As described above, in a case where a correlation operation of detection signals is performed between pairs of phase difference detection pixels, an area surrounded by a data waveform including a detection signal group (a1 to a5) including one of the pair of phase difference detection pixels and a data waveform including a detection signal group (b1 to b5) including the other one of the pair of phase difference detection pixels is calculated as a correlation value of two data waveforms.

As shown in FIG. 14, if the detection signal group (b1 to b5) is shifted rightward with respect to the detection signal group (a1 to a5), the number of signals of which positions overlap between the detection signal group (a1 to a5) and the detection signal group (b1 to b5) is reduced. That is, as a shift amount of the detection signal group (b1 to b5) becomes larger, a range of two pieces of data for calculating a correlation value becomes narrower, and thus, a reliability of a result of a correlation operation is lowered.

If a minimum value of a correlation value can be obtained in a state where a shift amount is not so large, it is possible to secure the reliability of the result of the correlation operation to a certain degree. However, in a large blur state where a main subject is completely out of focus, a shift amount necessary until a correlation value becomes a minimum value becomes large. Thus, in such a large blur state, the reliability of the result of the correlation operation is easily lowered, and thus, it is not possible to determine a focusing position. Even if the focusing position is determined, its accuracy is lowered.

JP2013-190734A does not recognize a problem that when a correlation operation is performed between pairs of phase difference detection pixels, a range of two pieces of data for calculating a correlation value becomes narrower, and thus, a reliability of a result of the correlation operation is lowered.

Further, an imaging device disclosed in JP2013-190734A has a mode where a focusing control is performed based on a result of a correlation operation between a detection signal of one of the pair of phase difference detection pixels and detection signals of imaging pixels. When the imaging device is operated in this mode, a detection signal of the other one of the pair of the phase difference detection pixels is not used. Accordingly, there is a high probability that an error is included in the result of the correlation operation.

In order to solve the above-mentioned problems, an object of the invention is to provide an imaging device and a focusing control method capable of enhancing accuracy of a focusing control based on a phase difference AF method.

According to an aspect of the invention, there is provided an imaging device comprising: an imaging element that includes an imaging surface where a plurality of signal detection units including a first signal detection unit that detects a signal corresponding to a beam that passes through one divided region among divided regions of a pupil region of an imaging optical system divided in a row direction, a second signal detection unit that detects a signal corresponding to a beam that passes through the other divided region, and a third signal detection unit that detects a signal corresponding to beams that pass through the two divided regions are arranged in a two-dimensional pattern in the row direction and a column direction that is orthogonal to the row direction, in which only the third signal detection units are arranged in the vicinity of a pair line where plural pairs of the first signal detection unit and the second signal detection unit are arranged in the row direction; a defocus amount generation unit that calculates, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of third signal detection units is larger than the number of pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generates a defocus amount from the third correlation value; and a focusing control unit that performs a focusing control for the imaging optical system based on the defocus amount generated by the defocus amount generation unit.

According to another aspect of the invention, there is provided a focusing control method of an imaging device including an imaging element that includes an imaging surface where a plurality of signal detection units including a first signal detection unit that detects a signal corresponding to a beam that passes through one divided region among divided regions of a pupil region of an imaging optical system divided in a row direction, a second signal detection unit that detects a signal corresponding to a beam that passes through the other divided region, and a third signal detection unit that detects a signal corresponding to beams that pass through the two divided regions are arranged in a two-dimensional pattern in the row direction and a column direction that is orthogonal to the row direction, in which only the third signal detection units are arranged in the vicinity of a pair line where plural pairs of the first signal detection unit and the second signal detection unit are arranged in the row direction, the method comprising: a defocus amount generation step of calculating, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of third signal detection units is larger than the number of pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generating a defocus amount from the third correlation value; and a focusing control step of performing a focusing control for the imaging optical system based on the defocus amount generated in the defocus amount generation step.

According to the invention, it is possible to provide an imaging device and a focusing control method capable of enhancing accuracy of a focusing control based on the phase difference AF method.

DESCRIPTION OF THE PREFERRED EMBODIMENTS

Hereinafter, embodiments of the invention will be described with reference to the accompanying drawings.

Figure 1:
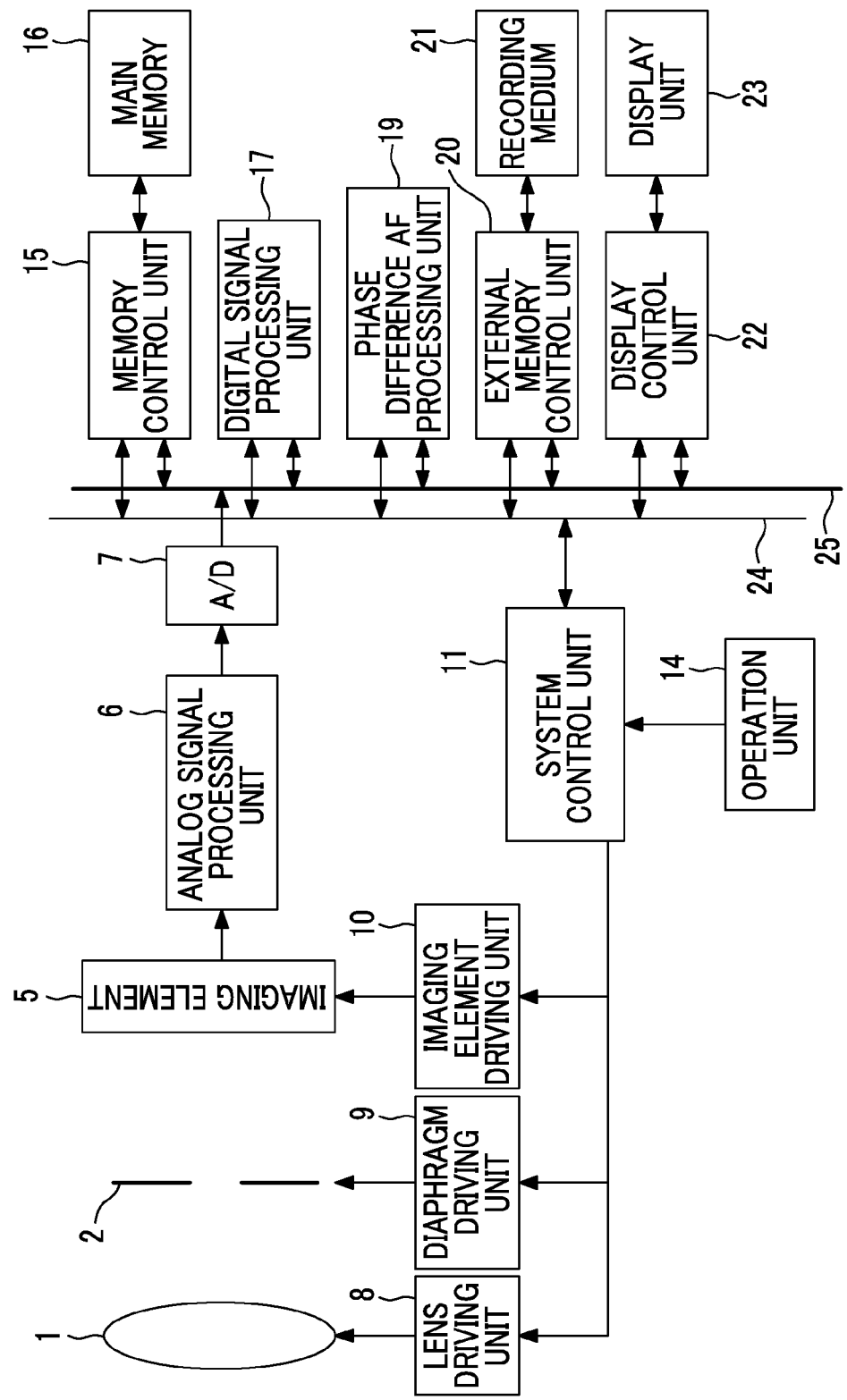
FIG. 1 is a diagram illustrating a schematic configuration of a digital camera which is an example of an imaging device for describing an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system.

The lens device is fixed to a camera main body, but may be exchanged with another lens device. The imaging lens 1 may include at least the focus lens. The focus lens may be a single focus lens that performs focus adjustment by moving the entirety of the lens system.

The digital camera includes an imaging element 5 of a CCD type, a CMOS type, or the like that images a subject through the lens device, an analog signal processing unit 6 that is connected to an output end of the imaging element 5 and performs analog signal processing such as a correlated double sampling process, and an A/D conversion circuit 7 that converts an analog signal output from the analog signal processing unit 6 into a digital signal.

The analog signal processing unit 6 and the A/D conversion circuit 7 are controlled by a system control unit 11. The analog signal processing unit 6 and the A/D conversion circuit 7 may be provided in the imaging element 5.

The system control unit 11 that generally controls the entirety of an electric control system of the digital camera performs a focusing control for controlling a lens driving unit 8 and driving the focus lens included in the imaging lens 1 to be focused on a main subject, or adjusts the position of the zoom lens included in the imaging lens 1. Further, the system control unit 11 controls the degree of opening of the diaphragm 2 through a diaphragm driving unit 9 to adjust a light exposure value.

Further, the system control unit 11 drives the imaging element 5 through an imaging element driving unit 10, and outputs a subject image captured through the imaging lens 1 as a captured image signal. An instruction signal from a user is input to the system control unit 11 through an operation unit 14. The instruction signal includes an instruction signal for instructing execution of a focusing control of the imaging optical system.

Further, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19, an external memory control unit 20 to which a detachable and attachably recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
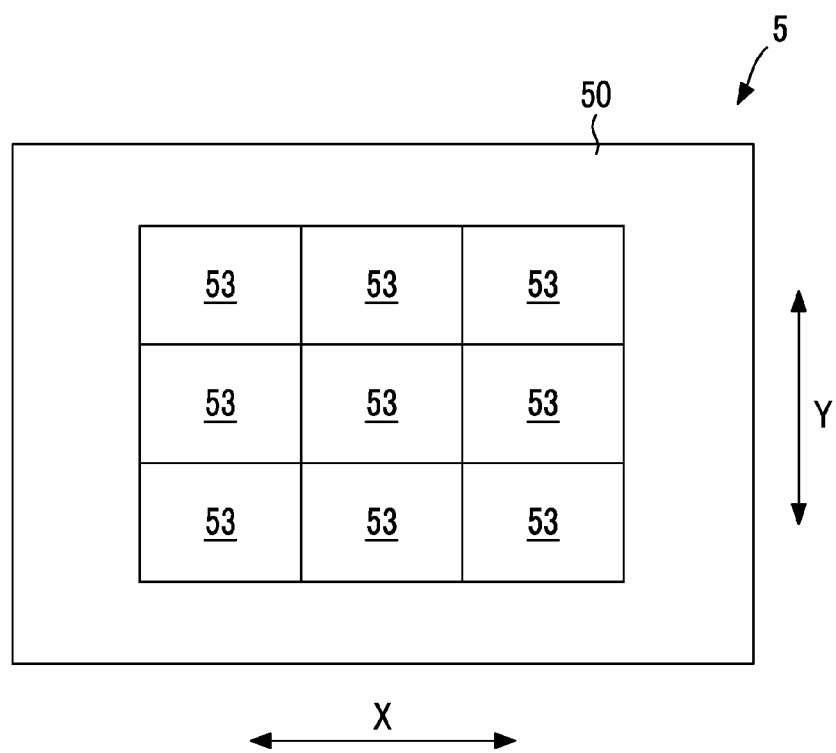
FIG. 2 is a schematic plan view illustrating an overall configuration of an imaging element 5 mounted on the digital camera shown in FIG. 1.

FIG. 2 is a schematic plan view illustrating an overall configuration of the imaging element 5 mounted on the digital camera shown in FIG. 1.

The imaging element 5 includes an imaging surface 50 on which plural pixels (signal detection units) which are arranged in two dimensions in a row direction X and in a column direction Y orthogonal to the X direction. In the example of FIG. 2, nine AF areas 53 which are target areas for focusing are provided on the imaging surface 50.

The AF area 53 is an area that includes an imaging pixel and a phase difference detection pixel as pixels.

In a portion where the AF areas 53 are excluded on the imaging surface 50, only imaging pixels are disposed. The AF areas 53 may be provided on the imaging surface 50 without a gap.

Figure 3:
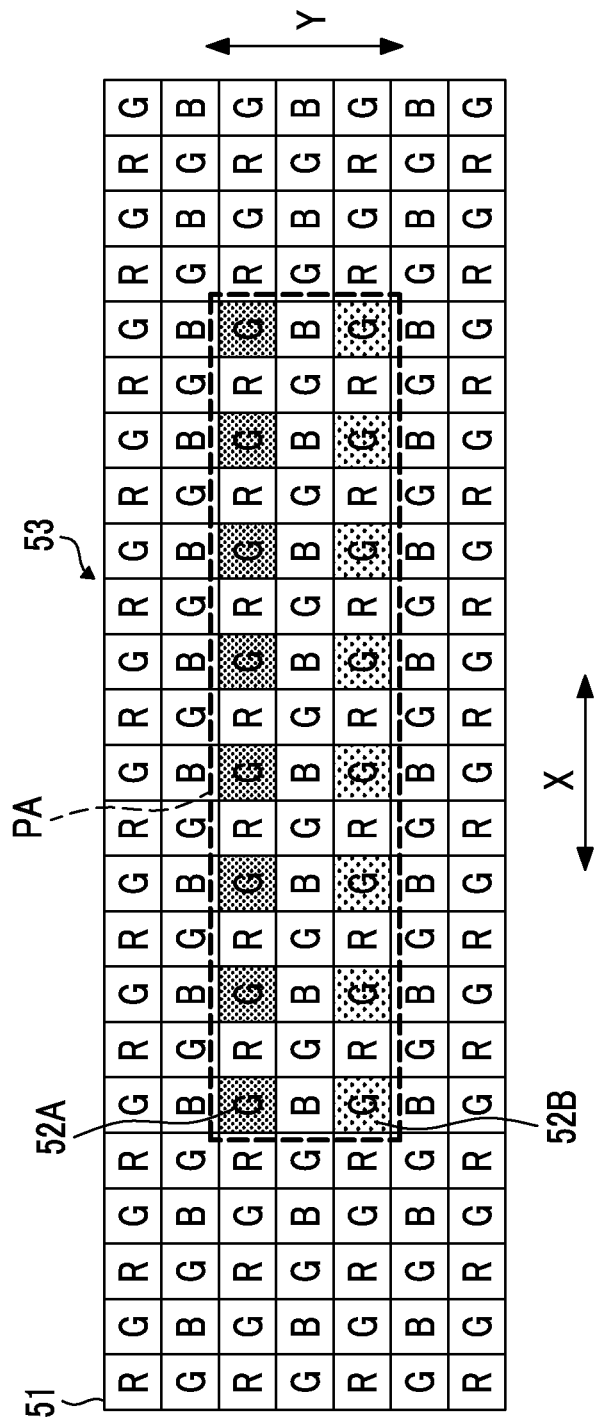
FIG. 3 is a partially enlarged view illustrating a single AF area 53 shown in FIG. 2.

FIG. 3 is a partially enlarged view illustrating a single AF area 53 shown in FIG. 2.

Pixels 51 (square shaped blocks in the figure) are arranged in the AF area 53 in two dimensions. Each pixel 51 includes a photoelectric conversion unit such as a photo diode, and a color filter formed above the photoelectric conversion unit.

In FIG. 3, letter "R" is given to a pixel 51 (may be referred to as R pixel 51) including a color filter (R filter) that transmits red light, letter "G" is given to a pixel 51 (may be referred to as G pixel 51) including a color filter (G filter) that transmits green light, and letter "B" is given to a pixel 51 (may be referred to as B pixel 51) including a color filter (B filter) that transmits blue light. The color filters are arranged in the form of a Bayer array over the entirety of the imaging surface 50.

In the AF area 53, a part of the G pixels 51 (shaded pixels in FIG. 3) are used as the phase difference detection pixels 52A and 52B. In the example of FIG. 3, a part of the respective G pixels 51 in a third row from the top are used as the phase difference detection pixels 52A. Further, the G pixel 51 of the same color in the column direction Y closest to each phase difference detection pixel 52A is used as the phase difference detection pixel 52B. The phase difference detection pixel 52A and the phase difference detection pixel 52B of the same color which is closest to the phase difference detection pixel 52A in the column direction Y form a pair. Plural pairs (eight in this example in the figure) are arranged in the row direction X, and a pair line is formed by these eight pairs. In the AF area 53, only the imaging pixels 51 are arranged in the vicinity of a region PA in which the pair line is arranged.

Since FIG. 3 is a partially enlarged view, only one pair line is shown in the AF area 53, but plural pair lines are arranged in the column direction Y in the AF area 53. That is, the AF area 53 has a configuration in which plural blocks having a configuration shown in FIG. 3 are arranged in the column direction Y.

Figure 4:
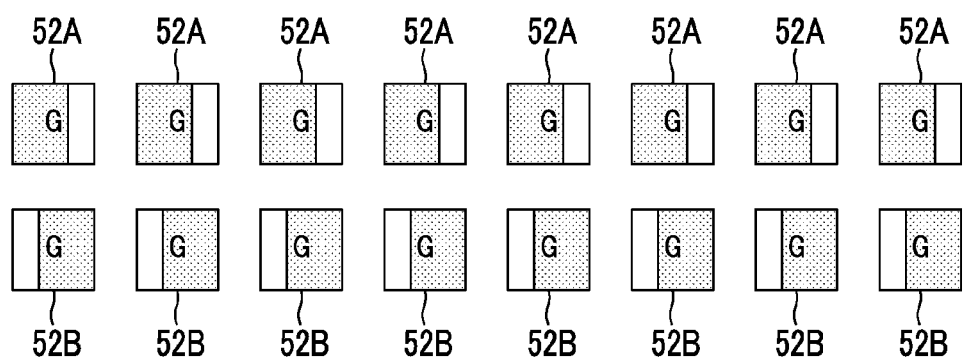
FIG. 4 is a diagram illustrating only phase difference detection pixels 52A and 52B arranged in a pair line shown in FIG. 3.

FIG. 4 is a diagram illustrating only the phase difference detection pixels 52A and 52B in one pair line shown in FIG. 3.

The phase difference detection pixel 52A is a first signal detection unit that receives a beam that passes through one divided region in a pupil region of the imaging lens 1, divided in one direction (in the row direction X in the example of FIG. 3) and detects a signal depending on the intensity of received light.

The phase difference detection pixel 52B is a second signal detection unit that receives a beam that passes through the other divided region in the pupil region of the imaging lens 1 and detects a signal depending on the intensity of received light.

Each imaging pixel 51 is a third signal detection unit that receives beams that pass through the two divided regions in the pupil region of the imaging lens 1 and detects a signal depending on the intensity of received light.

A light shielding film is provided above the photoelectric conversion unit of each pixel 51, and an opening for defining a light receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

Figure 5:
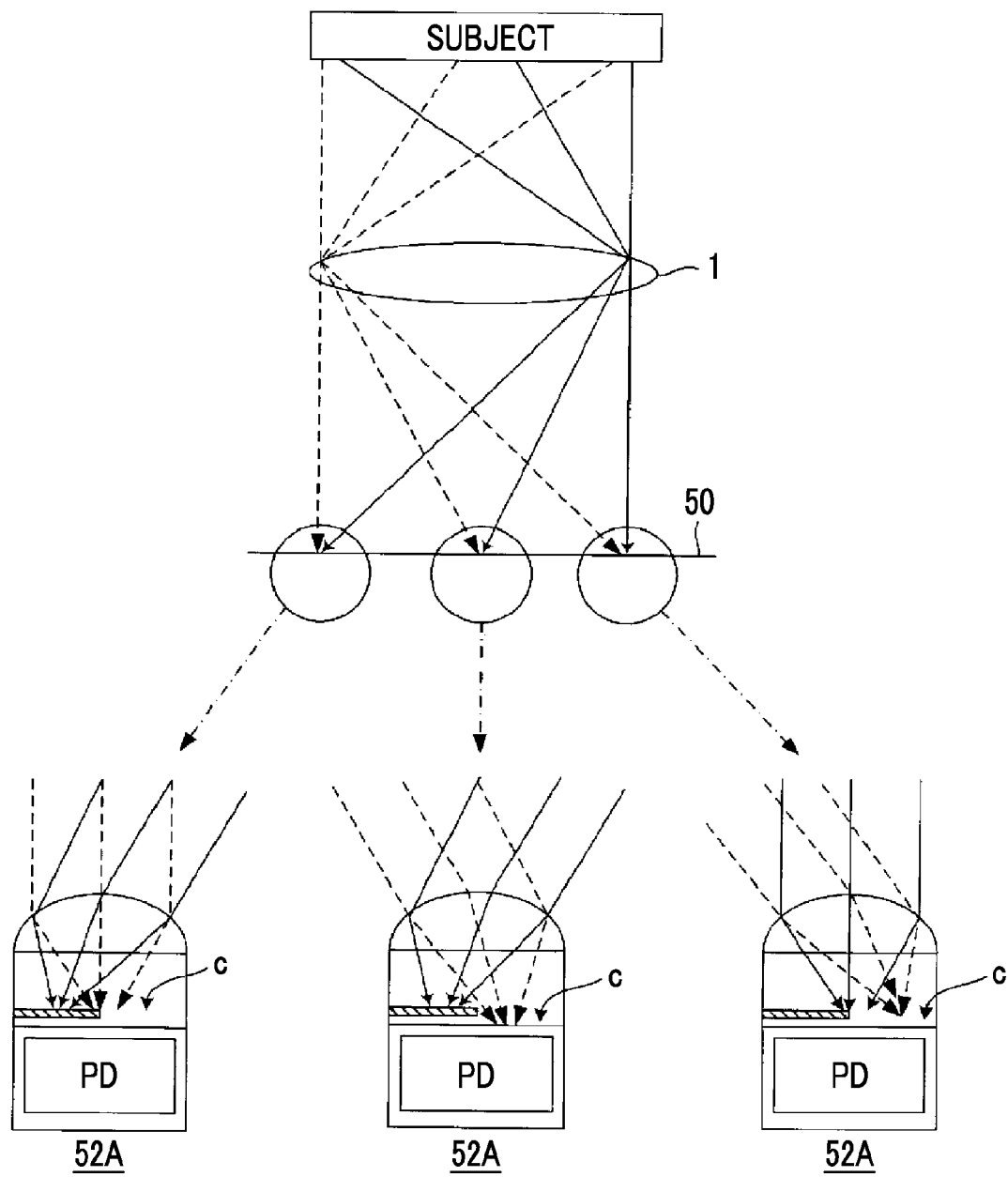
FIG. 5 is a diagram illustrating a sectional configuration of a phase difference detection pixel 52A.

FIG. 5 is a diagram illustrating a sectional configuration of the phase difference detection pixel 52A in the X direction. As shown in FIG. 5, an opening c of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit (PD) is covered by the light shielding film.

With such a configuration, it is possible to detect, using the plural phase difference detection pixels 52A and the plural phase difference detection pixels 52B that form the pair line, a phase difference in the row direction X in images respectively captured by the two pixel groups.

The phase difference AF processing unit 19 shown in FIG. 1 generates a defocus amount using any one method among two methods described below according to the degree of focusing of a subject formed in the AF area 53 selected by a user operation or the like. The phase difference AF processing unit 19 functions as a defocus amount generation unit.

(First Method)

The phase difference AF processing unit 19 performs a correlation operation with respect to detection signal groups of the phase difference detection pixels 52A and the phase difference detection pixels 52B of a pair line for each block in one AF area 53 selected from nine AF areas 53 through a user operation or the like, and calculates a phase difference (a shift amount of two detection signal groups in the row direction X when a correlation value of the two detection signal groups becomes a minimum) which is a relative deviation amount between an image captured by the phase difference detection pixels 52A and an image captured by the phase difference detection pixels 52B.

The phase difference AF processing unit 19 generates a defocus amount Dfr which is a movement value of the focus lens necessary for matching an image formation surface of a main subject and the imaging surface 50 of the imaging element 5 by the imaging lens 1, based on the phase difference. The phase difference AF processing unit 19 generates an average of the defocus amounts Dfr calculated with respect to respective blocks, and notifies the system control unit 11 of a defocus amount Df obtained by averaging the defocus amounts Dfr.

(Second Method)

The phase difference AF processing unit 19 acquires a detection signal group SA of plural phase difference detection pixels 52A that form a pair line and a detection signal group SB of plural phase difference detection pixels 52B that form the pair line, in each block of a selected AF area 53.

Further, the phase difference AF processing unit 19 acquires a detection signal group SN of imaging pixels 51 (hereinafter, referred to as correlation operation target pixels) that detect beams of the same colors as in the phase difference detection pixels 52A and 52B of which the number is larger than the number the pairs that form the pair line. Here, the imaging pixels 51 are arranged in a row different from a first row (a third pixel row from the top in the example of FIG. 3) including the plural phase difference detection pixels 52A that form the pair line and different from a second row (a fifth pixel row from the top in the example of FIG. 3) including the plural phase difference detection pixels 52B that form the pair line (here, the imaging pixels 51 being arranged in a row between the first row and the second row in the example of FIG. 3) and are arranged at the same pitch as that of the pairs that form the pair line.

The phase difference AF processing unit 19 calculates a third correlation value equal to a value obtained by adding up a first correlation value obtained by performing a correlation operation with respect to the detection signal group SA and the detection signal group SN and a second correlation value obtained by performing a correlation operation with respect to the detection signal group SB and the detection signal group SN, through an operation using the detection signal group SA, the detection signal group SB, and the detection signal group SN. Further, the phase difference AF processing unit 19 generates a defocus amount Df1 from the third correlation value.

The phase difference AF processing unit 19 calculates the third correlation value with respect to each block of the selected AF area 53, and generates a defocus amount Df1 from the third correlation value. Further, the phase difference AF processing unit 19 generates a defocus amount Df2 from the defocus amount Df1 generated with respect to each block, and notifies the system control unit 11 of the defocus amount Df2. For example, the defocus amount Df1 generated with respect to each block is used as the defocus amount Df2.

The system control unit 11 drives a focus lens based on the defocus amount Dfr or the defocus amount Df1 generated in the phase difference AF processing unit 19 to perform a focusing control. The system control unit 11 functions as a focusing control unit. Specifically, the system control unit 11 moves the focus lens by a defocus amount according to the defocus amount Df1 or the defocus amount Df2 notified from the phase difference AF processing unit 19 to perform the focusing control.

Hereinafter, a specific example of the second method will be described in detail.

Figure 6:
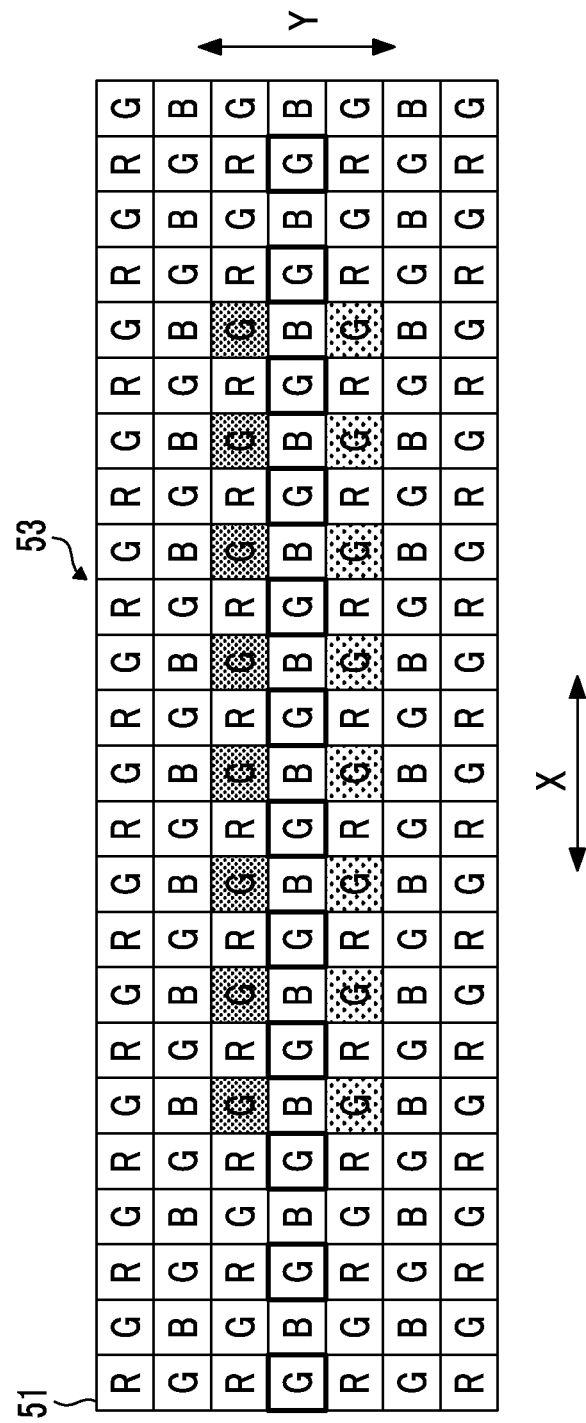
FIG. 6 is a diagram illustrating a method for generating a defocus amount in a large blur state.

FIG. 6 is a diagram illustrating a method for calculating the third correlation value. FIG. 6 shows one block in the AF area 53 shown in FIG. 3.

In FIG. 6, G pixels 51 in a fourth row surrounded by thick frames are used as correlation operation target pixels. As shown in FIG. 6, an arrangement pitch of the correlation operation target pixels in the row direction X are the same as an arrangement pitch of the pairs of the phase difference detection pixels 52A and 52B in the row direction X. Further, the number of the correlation operation target pixels is larger by four than the number of pairs of phase difference detection pixels 52A and 52B.

Figure 7:
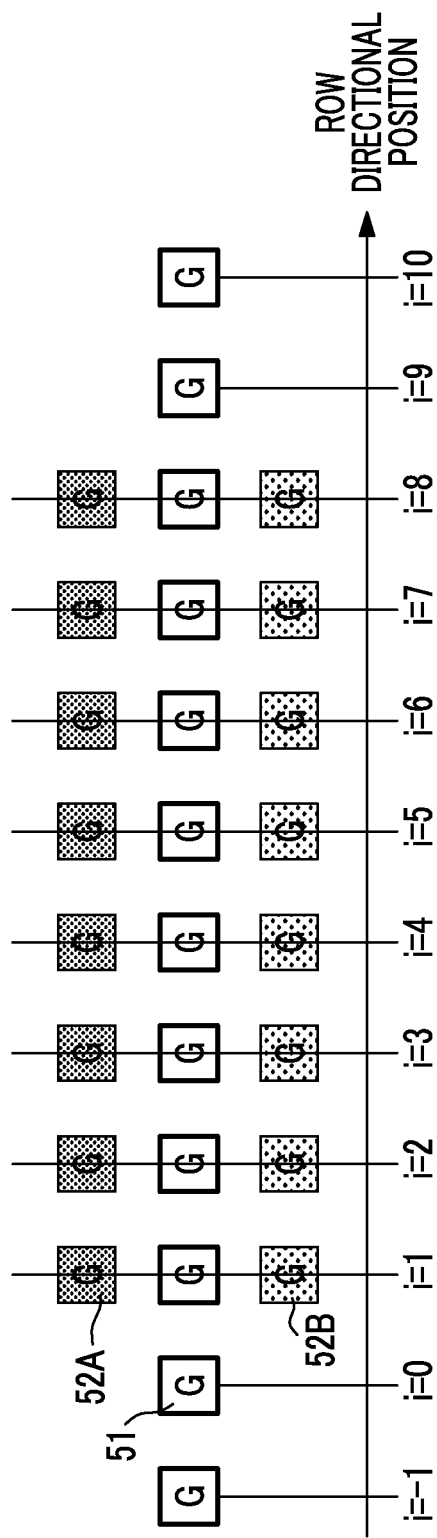
FIG. 7 is a diagram illustrating a method for generating a defocus amount in a large blur state.

FIG. 7 is a diagram illustrating extraction of the phase difference detection pixels 52A, the phase difference detection pixels 52B, and the imaging pixels 51 which are the correlation operation target pixels in FIG. 6.

In FIG. 6, an imaging pixel 51 which is a correlation operation target pixel, disposed on a lower left side of the phase difference detection pixel 52A and on an upper left side of the phase difference detection pixel 52B, is considered to be disposed at approximately the same position as those of the phase difference detection pixels 52A and 52B. Thus, in FIG. 7, it is shown that a row-directional X position (indicated by "i") of an imaging pixel 51 which is a correlation operation target pixel disposed on a lower left side of an arbitrary phase difference detection pixel 52A is the same as that of the phase difference detection pixel 52A.

In FIG. 7, a detection signal of a phase difference detection pixel 52A at a position i is referred to as $SA_i$. A detection signal of a phase difference detection pixel 52B at the position i is referred to as $SB_i$. A detection signal of the imaging pixel 51 at the position i is referred to as $SN_i$.

Through this setting, a detection signal group including $SA_1$ to $SA_8$ becomes the detection signal group SA, a detection signal group including $SB_1$ to $SB_8$ becomes the detection signal group SB, and a detection signal group including $SN_{-1}$ to $SN_{10}$ becomes the detection signal group SN.

A first correlation value S[A−N] which is a correlation value of the detection signal group including $SN_{-1}$ to $SN_{10}$ with respect to the detection signal group including $SA_1$ to $SA_8$ may be calculated by the following Expression (1). Here, d represents a shift amount of the two detection signal groups, which is a value which increases or decreases by one from −L to L. L represents an arbitrary value.

$$S[A-N] = \sum_{i=1}^{8} |SA_i - SN_{i+d}|^2 \quad (1)$$

$$d = -L, \ldots, -1, 0, 1, 2 \ldots L$$

A second correlation value S [B–N] which is a correlation value of the detection signal group including $SN_{-1}$ to $SN_{10}$ with respect to the detection signal group including $SB_1$ to $SB_8$ may be calculated by the following Expression (2).

$$S[B-N] = \sum_{i=1}^{8} |SB_i - SN_{i+d}|^2 \quad (2)$$

$$d = -L, \ldots, -1, 0, 1, 2 \ldots L$$

From Expression (1), it is possible to calculate the first correlation value indicating a matching degree of the detection signal group SN and the detection signal group SA when the detection signal group SN is shifted by the shift amount d in the row direction X with respect to the detection signal group SA.

As understood from FIG. 7, the detection signal group SN has a large number of signals compared with that of the detection signal group SA. Thus, when the value of the shift amount d is in a range of −2 to +2, it is possible to use all detection signals of the detection signal group SA for calculation of the first correlation value.

Further, from Expression (2), it is possible to calculate the second correlation value indicating a matching degree of the detection signal group SN and the detection signal group SB when the detection signal group SN is shifted by the shift amount d in the row direction X with respect to the detection signal group SB.

As understood from FIG. 7, the detection signal group SN has a large number of signals, compared with that of the detection signal group SB. Thus, when the value of the shift amount d is in a range of −2 to +2, it is possible to use all detection signals of the detection signal group SB for calculation of the second correlation value.

In this way, in the correlation operation of Expression (1) and Expression (2), compared with a case where the correlation operation is performed with respect to the detection signal group SA and the detection signal group SB, the number of detection signals of phase difference detection pixels capable of being used for an operation becomes large.

Accordingly, when generating a defocus amount using Expression (1) and Expression (2), even in a large blur state where the shift amount d is large, it is possible to enhance reliability of the generated defocus amount.

Here, $SN_i$ may be approximated to a sum of the detection signal $SA_i$ of the phase difference detection pixel 52A at the position i and the detection signal $SB_i$ of the phase difference detection pixel 52B at the position i.

That is, a relationship of the following Expression (3) is established.

$$SN_{i+d} = SA_{i+d} + SB_{i+d} \quad (3)$$

If Expression (3) is substituted in Expression (1), Expression (4) is obtained.

$$S[A-N] = \sum_{i=1}^{8} |SA_i - SA_{i+d} - SB_{i+d}|^2 \quad (4)$$

$$d = -L, \ldots, -1, 0, 1, 2 \ldots L$$

Since $A_{i+d}$ and $B_{i+d}$ are respectively positive values, Expression (4) may be modified into the following Expression (5).

$$S[A-N] = \sum_{i=1}^{8} |SA_i - SB_{i+d}|^2 - \sum_{i=1}^{8} |SA_{i+d}|^2 \quad (5)$$

$$d = -L, \ldots, -1, 0, 1, 2 \ldots L$$

Similarly, Expression (2) may be modified into the following Expression (6).

$$S[B-N] = \sum_{i=1}^{8} |SB_i - SA_{i+d}|^2 - \sum_{i=1}^{8} |SB_{i+d}|^2 \quad (6)$$

$$d = -L, \ldots, -1, 0, 1, 2 \ldots L$$

A sum of S[A–N] in Expression (5) and S[B–N] in Expression (6) becomes the following Expression (7).

$$\begin{aligned} S[A-N] + S[B-N] &= \sum_{i=1}^{8} |SA_i - SB_{i+d}|^2 - \sum_{i=1}^{8} |SA_{i+d}|^2 + \\ & \quad \sum_{i=1}^{8} |SB_i - SA_{i+d}|^2 - \sum_{i=1}^{8} |SB_{i+d}|^2 \\ &= \sum_{i=1}^{8} |SA_i - SB_{i+d}|^2 + \sum_{i=1}^{8} |SB_i - SA_{i+d}|^2 - \\ & \quad \sum_{i=1}^{8} |SN_{i+d}|^2 \end{aligned} \quad (7)$$

Accordingly, the phase difference AF processing unit 19 may perform an operation of Expression (7) to obtain the third correlation value.

Expression (7) may include a case where there is no detection signal depending on the value of the shift amount d. For example, when d=1 and i=8, $SB_{i+d}$=SB9 appears as an expression, but a detection signal $SB_9$ is not present. Thus, in this case, a value of a term including $SB_9$ is considered as 0. This is similarly applied to $SA_{i+d}$ and $SN_{i+d}$.

The phase difference AF processing unit 19 sets the value of the shift amount d when the third correlation value calculated by Expression (7) becomes a minimum as a phase difference, and generates the defocus amount Df1 from the phase difference. As described above, it is possible to enhance the accuracy of detection of a phase difference, compared with a case where the correlation operation is performed with respect to the detection signal group SA and the detection signal group SB to calculate a phase difference.

Next, an auto-focus operation of the digital camera shown in FIG. 1 will be described.

Figure 8:
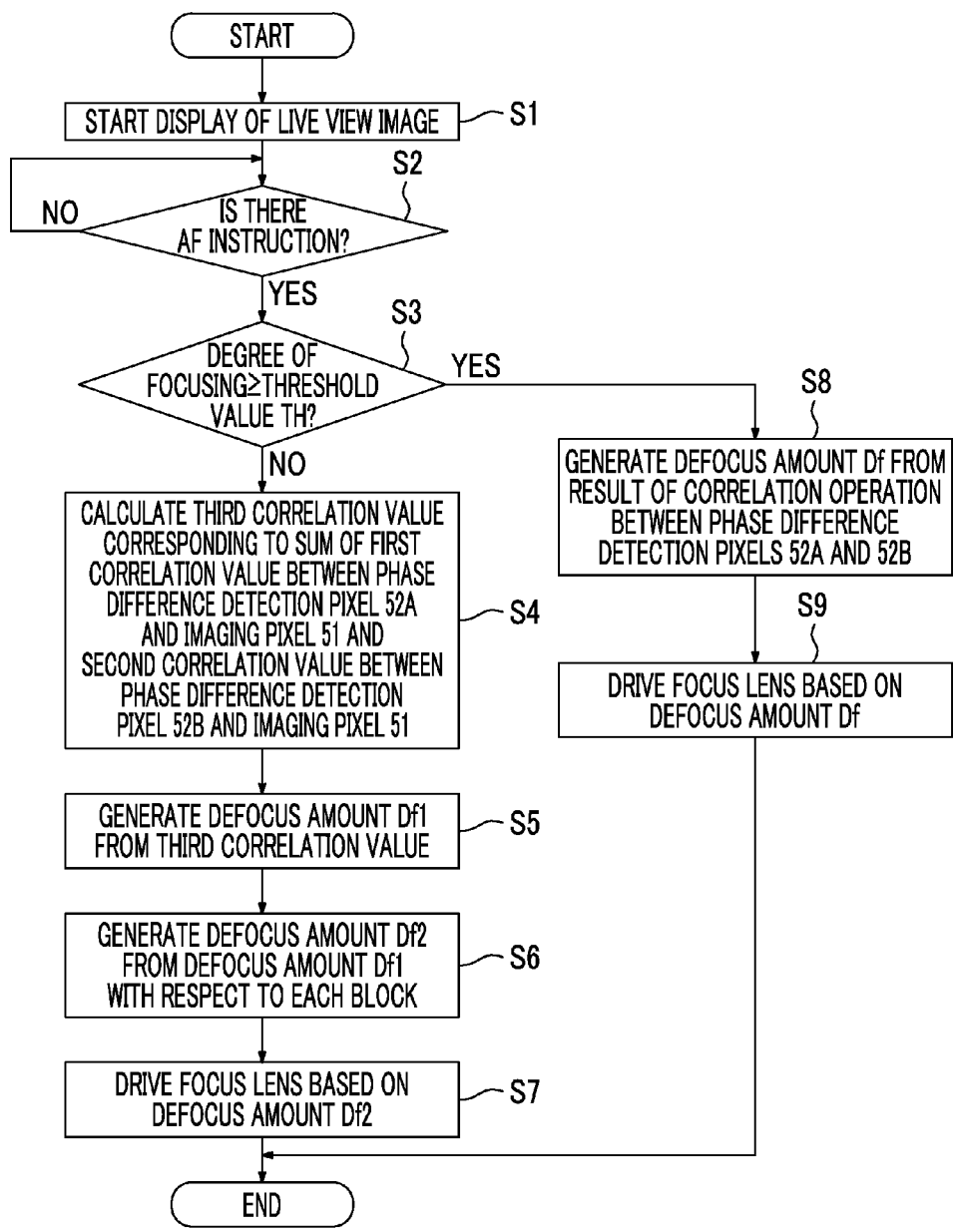
FIG. 8 is a flowchart illustrating an auto-focus operation of the digital camera shown in FIG. 1.

FIG. 8 is a flowchart illustrating the auto-focus operation of the digital camera shown in FIG. 1.

If the digital camera is set to an imaging mode, the system control unit 11 starts display of a live view image (step S1). Specifically, the system control unit 11 repeats a control for imaging a subject using the imaging element 5 and displaying an image based on captured image data obtained through the imaging on the display unit 23.

After the display of the live view image is started, if an execution instruction (hereinafter, referred to as an auto-focus execution instruction, which is represented as an AF instruction in the figure) of a focusing control of the imaging optical system is given according to a half-push operation or the like of a shutter button provided in the operation unit 14 (step S2: YES), the phase difference AF processing unit 19 determines the degree of focusing of a subject imaged on a selected AF area 53 using the latest image signals (hereinafter, referred to as captured image signals Ga) among captured image signals obtained when the auto-focus execution instruction is given. The phase difference AF processing unit 19 functions as a focusing degree determination unit.

For example, the phase difference AF processing unit 19 performs a correlation operation of detection signal groups between the phase difference detection pixels 52A and 52B obtained from each block of a selected AF area 53, among the captured image signals Ga, and compares a value of a phase difference obtained through the correlation operation with a threshold value TH1.

Further, if the phase difference is equal to or larger than the threshold value TH1, the phase difference AF processing unit 19 determines that the degree of focusing is smaller than the threshold value TH (large blur). If the phase difference is smaller than the threshold value TH1, the phase difference AF processing unit 19 determines that the degree of focusing is equal to or larger than the threshold value TH (small blur).

Further, in a case where the phase difference is not determined although the correlation operation of detection signal groups is performed between the phase difference detection pixels 52A and 52B obtained from each block of the selected AF area 53 from among the captured image signals Ga, the phase difference AF processing unit 19 determines that the degree of focusing is smaller than the threshold value TH (large blur).

A shift amount of two detection signal groups when a correlation value calculated through a correlation operation becomes a minimum is detected as a phase difference, but in a case where there is not a large difference in correlation values with respect to respective shift amounts, it is not possible to determine a phase difference. Such a case is considered as a state where a subject has a small amount of edges and blur is large. Accordingly, it is possible to determine that the degree of focusing is smaller than the threshold value TH when the phase difference cannot be detected, and it is possible to determine that the degree of focusing is equal to or larger than the threshold value TH when the phase difference can be detected.

Further, the phase difference AF processing unit 19 calculates contrast of a subject formed in the AF area 53 using detection signals of the imaging pixels 51 in the selected AF area 53 among the captured image signals Ga.

Specifically, an integrated value of differences of detection signals of adjacent imaging pixels 51 in the AF area 53 is calculated as a contrast value. There is a high probability that a subject with a low contrast value is in a large blur state. Accordingly, if the contrast value is smaller than a threshold value TH2, the phase difference AF processing unit 19 determines that the degree of focusing is smaller than the threshold value TH. If the contrast value is equal to or larger than the threshold value TH2, the phase difference AF processing unit 19 determines that the degree of focusing is equal to or larger than the threshold value TH.

As a result of determination, if the degree of focusing is smaller than the threshold value TH (step S3: NO), the phase difference AF processing unit 19 performs the process of step S4. If the degree of focusing is equal to or larger than the threshold value TH (step S3: YES), the phase difference AF processing unit 19 performs the process of step S8.

In step S8, the phase difference AF processing unit 19 performs a correlation operation with respect to a detection signal group of the phase difference detection pixels 52A and a detection signal group of the phase difference detection pixels 52B, arranged in each block in a selected AF area 53, among the captured image signals Ga, and generates a defocus amount Dfr with respect to each block. Further, the phase difference AF processing unit 19 generates an average value of the defocus amounts Dfr as a final defocus amount Df, and notifies the system control unit 11 of the defocus amount Df.

The system control unit 11 moves the focus lens by the defocus amount Df based on the defocus amount Df notified from the phase difference AF processing unit 19 (step S9), and completes auto-focusing.

In step S4, the phase difference AF processing unit 19 acquires the detection signal group SA, the detection signal group SB, and the detection signal group SN obtained from each block in the selected AF area 53, among the captured image signals Ga. Further, the phase difference AF processing unit 19 calculates the third correlation value through the operation of Expression (7).

The phase difference AF processing unit 19 generates the defocus amount Df1 from the calculated third correlation value (step S5). The phase difference AF processing unit 19 generates the defocus amount Df2 from the defocus amount Df1 generated with respect to each block (step S6).

If the defocus amount Df2 is generated in step S6, the phase difference AF processing unit 19 notifies the system control unit 11 of the defocus amount Df2. The system control unit 11 moves the focus lens by a distance corresponding to the defocus amount Df2, based on the defocus amount Df2 (step S7), and completes auto-focusing.

As described above, according to the digital camera shown in FIG. 1, since the defocus amount Df1 is generated using not only the detection signal group of the phase difference detection pixels 52A, the detection signal group of the phase difference detection pixels 52B, but also the detection signal group of the imaging pixels 51 having a larger number of detection signals compared with that of the detection signal groups of the phase difference detection pixels 52A and 52B, it is possible to secure the accuracy of focusing even in a large blur state.

In the operation example of FIG. 8, the process of step S4 and the subsequent processes are performed when the degree of focusing is smaller than the threshold value. However, the process of step S4 and the subsequent processes may be constantly performed. The process of step S4 and the subsequent processes are effective in a large blur state where a shift amount of two detection signal groups of the phase difference detection pixels 52A and 52B is large. Thus, by performing the process of step S4 and the subsequent processes only when the degree of focusing is smaller than the threshold value, it is possible to prevent an increase in computation.

In description of FIG. 6, total two imaging pixels 51 arranged on an outer side in the row direction X with reference to a left end portion of a region where the eight imaging pixels 51 are arranged, and total two imaging pixels 51 on an outer side in the row direction with reference to a left end portion of the region where the eight imaging pixels 51 are arranged, in addition to total eight imaging pixels 51 arranged in one direction (lower left direction) with respect to each phase detection pixel 52A in the block, are used as correlation operation target pixels in combination.

Figure 9:
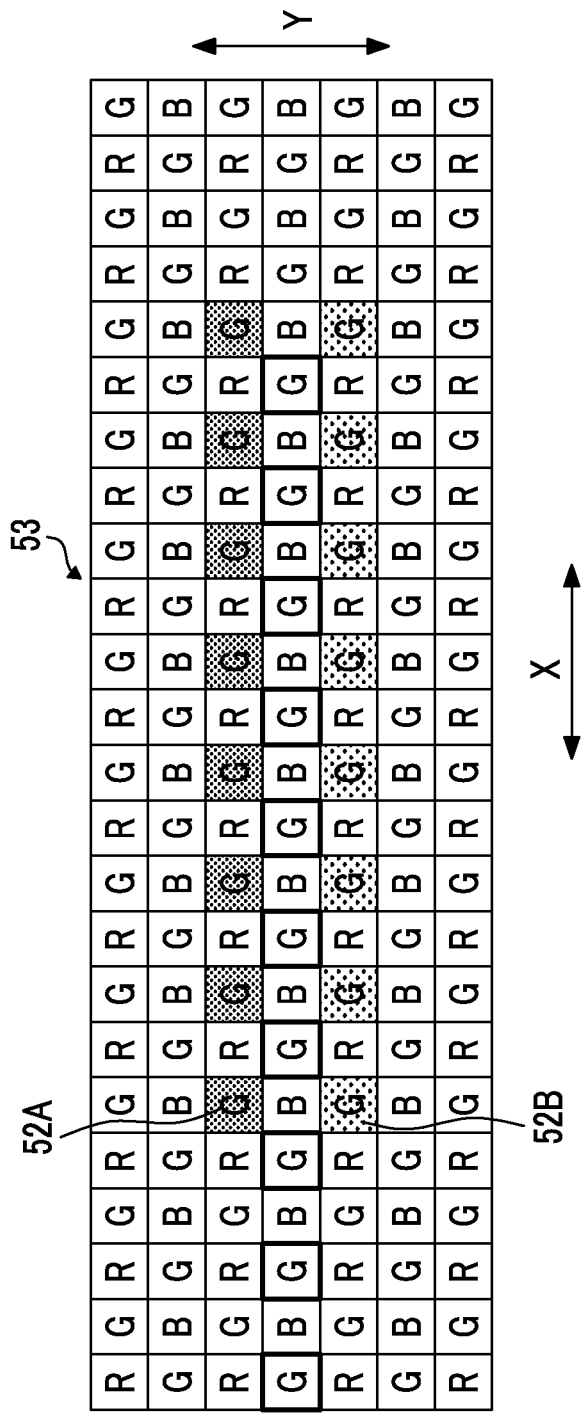
FIG. 9 is a diagram illustrating a modification example of imaging pixels 51 used for generation of a defocus amount in a large blur state.

However, as shown in FIG. 9, ten imaging pixels 51 including total eight imaging pixels 51 arranged in one direction (lower left direction) with respect to each phase detection pixel 52A in the block and total two imaging pixels 51 arranged on the outer side in the row direction X with reference to the left end portion of the region where the eight imaging pixels 51 are arranged may be used as correlation operation target pixels. Even in this case, it is possible to enhance the accuracy of focusing.

Figure 10:
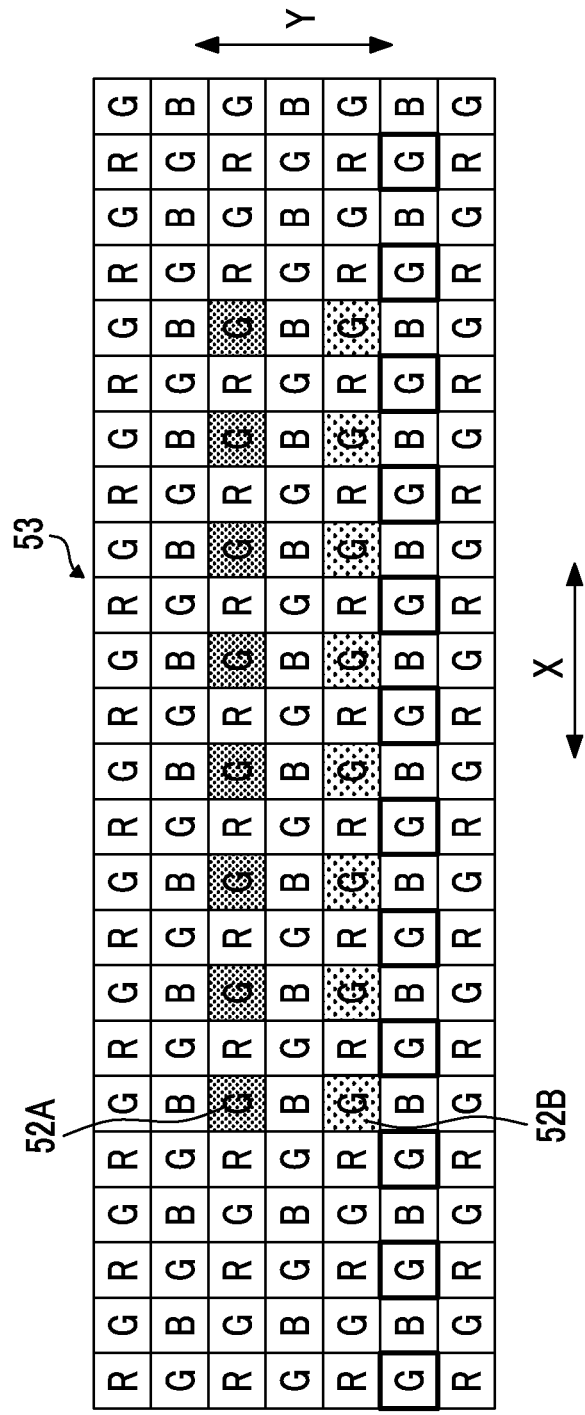
FIG. 10 is a diagram illustrating a modification example of imaging pixels 51 used for generation of a defocus amount in a large blur state.

Further, as shown in FIG. 10, total G pixels 51 (surrounded by thick lines) in a row below the second row including the phase difference detection pixels 52B may be used as correlation operation target pixels. As shown in FIGS. 6 and 9, by using the G pixels 51 disposed between the first row including the phase difference detection pixels 52A and the second row including the phase difference detection pixels 52B as correlation operation target pixels, the approximation of Expression (3) becomes more accurate. Thus, it is possible to enhance the accuracy of focusing.

Further, while the accuracy of focusing becomes higher as the number of correlation operation target pixels becomes larger, if the number is excessively large, the computation of Expression (7) increases, which results in an increase in power consumption. Thus, it is preferable that the phase difference AF processing unit 19 controls the number of correlation operation target pixels.

Specifically, in a case where the degree of focusing determined in step S3 of FIG. 8 is smaller than the threshold value TH, the phase difference AF processing unit 19 makes the number of imaging pixels which are correlation operation targets become larger as the degree of focusing becomes lower.

Whether or not the degree of focusing is low may be determined according to a parameter indicating the degree of focusing. As the parameter, a phase difference calculated by a correlation operation with respect to a detection signal group of the phase difference detection pixels 52A and a detection signal group of the phase difference detection pixels 52B, or the above-mentioned contrast value is used.

If the phase difference is large (that is, if the degree of focusing is low), the accuracy of focusing is easily lowered, and thus, the phase difference AF processing unit 19 increases the number of correlation operation target pixels. If the phase difference is small, the accuracy of focusing is not easily lowered, and thus, the phase difference AF processing unit 19 decreases the number of correlation operation target pixels.

If the contrast value is small (that is, if the degree of focusing low), the accuracy of focusing is easily lowered, and thus, the phase difference AF processing unit 19 increases the number of correlation operation target pixels. If the contrast value is large, the accuracy of focusing is not easily lowered, and thus, the phase difference AF processing unit 19 decreases the number of correlation operation target pixels.

In this way, it is possible to achieve enhancement of the accuracy of focusing and reduction of power consumption in parallel.

In the imaging pixels 5, the phase difference detection pixels 52A and the phase difference detection pixels 52B that form pairs are arranged in different rows, but the phase difference detection pixels 52A and the phase difference detection pixels 52B that form the pairs may be arranged at the same row.

Figure 11:
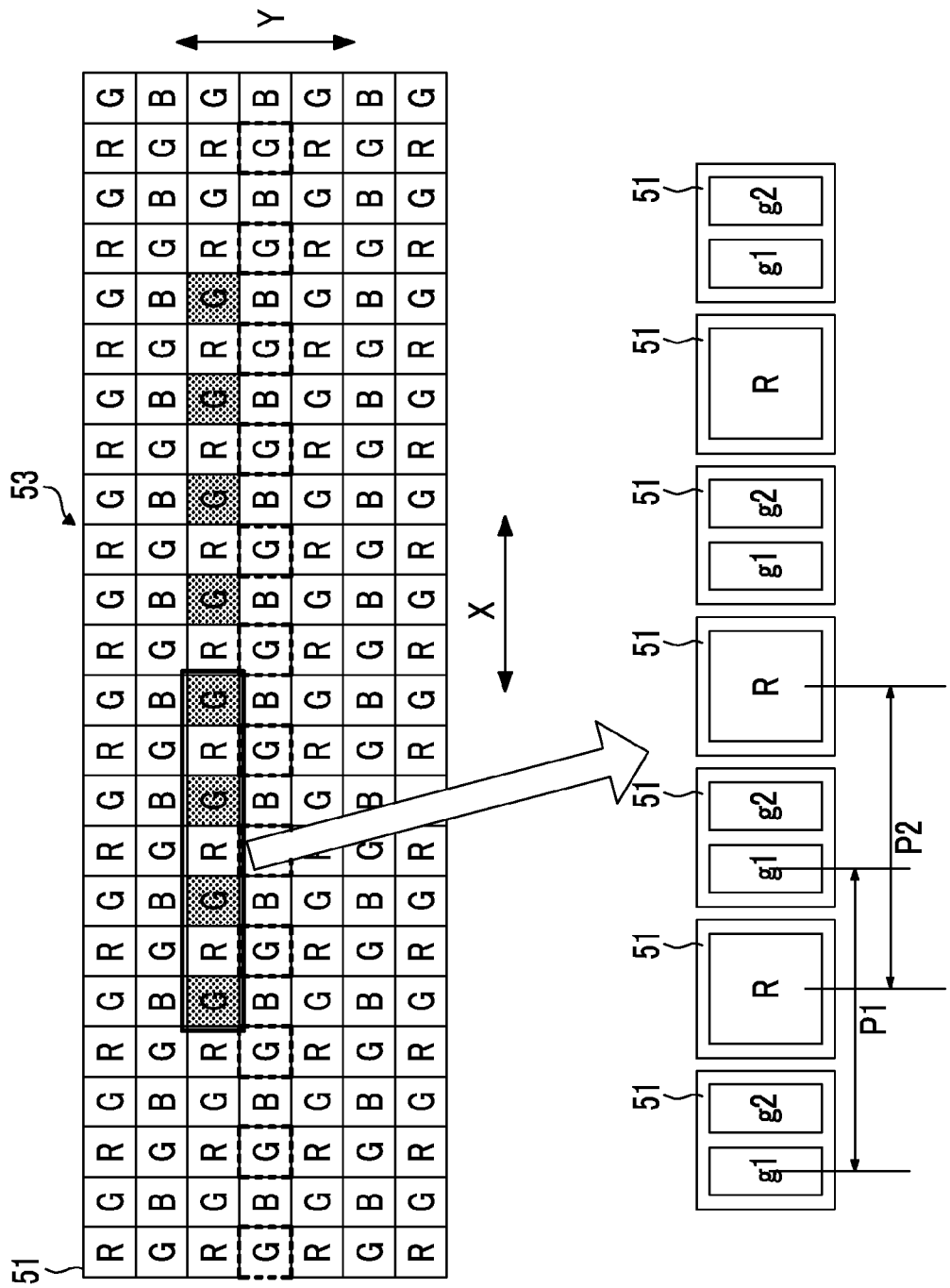
FIG. 11 is a diagram illustrating a modification example of the imaging element 5 of the digital camera shown in FIG. 1.

FIG. 11 is a diagram illustrating a modification example of an internal configuration of one block in an AF area 53 of the imaging pixel 5.

In the configuration of FIG. 11, shaded pixels 51 function as a first signal detection unit, a second signal detection unit, and a third signal detection unit, respectively.

As shown in a partially enlarged view of a portion surrounded by a thick frame in FIG. 11, each shaded pixel 51 is divided into two parts, in which the divided two parts are referred to as a phase difference detection pixel g1 and a phase difference detection pixel g2, respectively.

In this configuration, the phase difference detection pixel g1 becomes the first signal detection unit, and the phase difference detection pixel g2 becomes the second signal detection unit. It is possible to read signals independently from the first signal detection unit and the second signal detection unit in the pixel 51.

Further, if the signals of the first signal detection unit and the second signal detection unit in the same pixel 51 are added up, a normal imaging signal without a phase difference is obtained. Accordingly, the shaded pixel 51 functions as the third signal detection unit.

In the configuration of FIG. 11, similarly, a distance P1 between adjacent phase difference detection pixels g1 in the row direction X is the same as a distance P2 between adjacent R pixels 51. Thus, by using G pixels 51 surrounded by dotted lines as correlation operation target pixels, it is possible to apply the same processes as the above-described processes.

In this embodiment, an example in which the digital camera is used as the imaging device is shown, but hereinafter, an embodiment in which a smart phone with a camera is used as the imaging device will be described.

Figure 12:
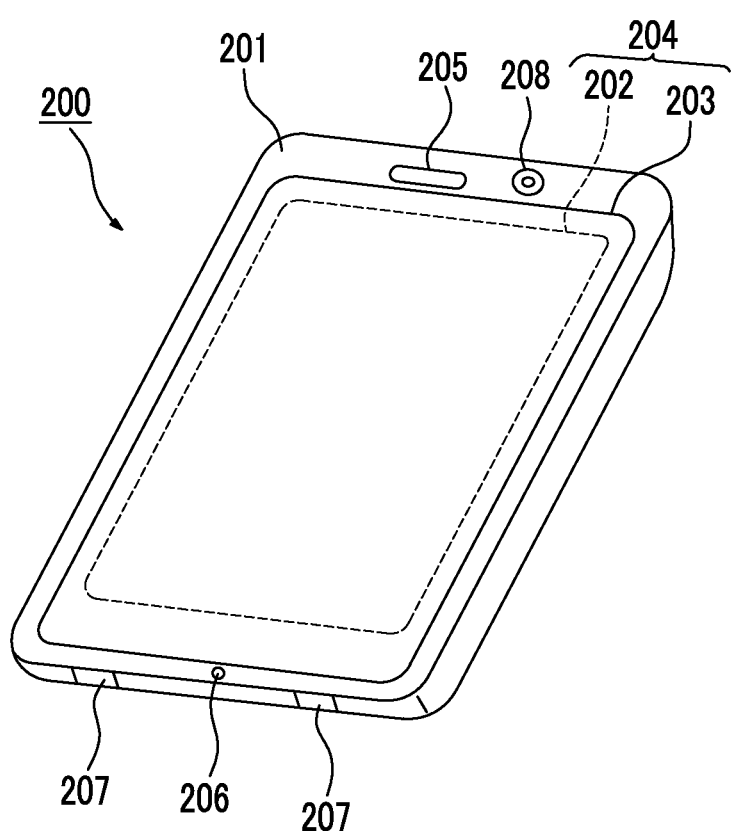
FIG. 12 is a diagram illustrating a smart phone which is an imaging device.

FIG. 12 is a diagram showing an appearance of a smart phone 200 which is an embodiment of the imaging device of the invention. The smart phone 200 shown in FIG. 12 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed. Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 13:
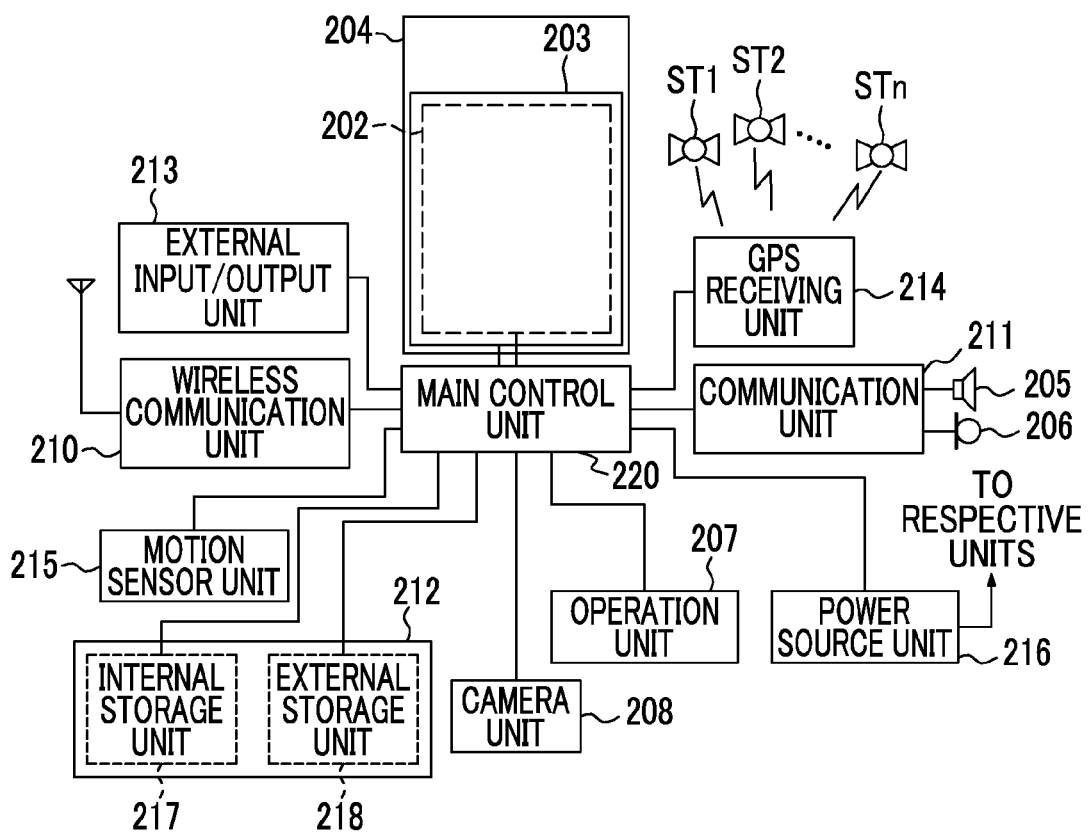
FIG. 13 is an internal block diagram illustrating the smart phone shown in FIG. 12.
Figure 14:
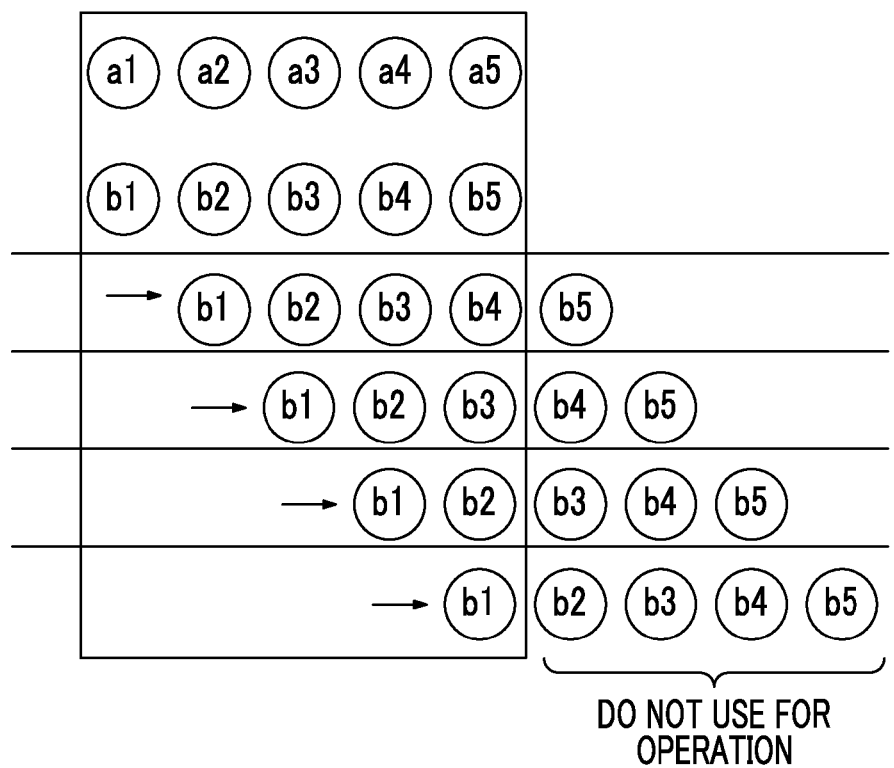
FIG. 14 is a diagram illustrating a relationship between two detection signal groups when a correlation operation is performed.

FIG. 13 is a block diagram illustrating the configuration of the smart phone 200 shown in FIG. 12. As shown in FIG. 13, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided. Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is mounted so that an image displayed on a display surface of the display panel 202 can be visually recognized and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 12, the display panel 202 and the operation panel 203 of the smart phone 200 shown as an example of an embodiment of the imaging device of the invention are integrated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like. Furthermore, as a position detecting method employed in the operation panel 203, any one of a matrix switch type, a resistive film type, a surface acoustic wave type, an infrared type, an electromagnetic induction type, an electrostatic capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 12, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 12, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable and attachably memory slot. Each of the internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As an external device connected to the smart phone 200, for example, a wired or wireless headset, a wired or wireless external charger, a wired or wireless data port, a memory card, a subscriber identity module (SIM) or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, both a personal computer and a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to an instruction of the main control unit 220, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a static image or a video image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a soft key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Furthermore, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

The main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1. The captured image data generated by the camera unit 208 may be recorded in the storage unit 212, or may be output through the input/output unit 213 or the wireless communication unit 210. In the smart phone 200 shown in FIG. 12, the camera unit 208 is mounted on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203. Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor 215, or the like may be added to the image data on a static image or a video image, and the result may be recorded in the storage unit 212, or may be output through the input/output unit 213 or the wireless communication unit 210.

In the smart phone 200 with the above-described configuration, similarly, by using the imaging element 5 as the imaging element of the camera unit 208, and by performing the processes shown in FIG. 8 in the main control unit 220 and the camera unit 208, it is possible to perform a focusing control with high accuracy regardless of subjects even in a large blur state.

As described above, this specification discloses the following content.

According to the disclosure, an imaging device includes: an imaging element that includes an imaging surface where a plurality of signal detection units including a first signal detection unit that detects a signal corresponding to a beam that passes through one divided region among divided regions of a pupil region of an imaging optical system divided in a row direction, a second signal detection unit that detects a signal corresponding to a beam that passes through the other divided region, and a third signal detection unit that detects a signal corresponding to beams that pass through the two divided regions are arranged in a two-dimensional pattern in the row direction and a column direction that is orthogonal to the row direction, in which only the third signal detection units are arranged in the vicinity of a pair line where plural pairs of the first signal detection unit and the second signal detection unit are arranged in the row direction; a defocus amount generation unit that calculates, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of third signal detection units is larger than the number of pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generates a defocus amount from the third correlation value; and a focusing control unit that performs a focusing control for the imaging optical system based on the defocus amount generated by the defocus amount generation unit.

In the disclosed imaging device, the imaging element may be configured in which the first signal detection unit and the second signal detection unit that form the pair are arranged in different rows.

In the disclosed imaging device, the row including the third signal detection units of which the number is larger than the number of pairs may be disposed between the row including the plurality of first signal detection units and the row including the plurality of second signal detection units.

The disclosed imaging device may further include a focusing degree determination unit that determines the degree of focusing of a main subject formed in a region including the pair line in the imaging surface, and the defocus amount generation unit may generate the defocus amount from the third correlation value in a case where it is determined by the focusing degree determination unit that the degree of focusing is smaller than a threshold value, or may generate the defocus amount from a correlation value between the detection signal group of the plurality of first signal detection units and the detection signal group of the plurality of second signal detection units in a case where it is determined by the focusing degree determination unit that the degree of focusing is equal to or larger than the threshold value.

In the disclosed imaging device, the defocus amount generation unit may make the number of detection signals that form the detection signal group of the third signal detection units used in calculating the third correlation value become larger as the degree of focusing becomes lower.

According to the disclosure, a focusing control method of an imaging device including an imaging element that includes an imaging surface where a plurality of signal detection units including a first signal detection unit that detects a signal corresponding to a beam that passes through one divided region among divided regions of a pupil region of an imaging optical system divided in a row direction, a second signal detection unit that detects a signal corresponding to a beam that passes through the other divided region, and a third signal detection unit that detects a signal corresponding to beams that pass through the two divided regions are arranged in a two-dimensional pattern in the row direction and a column direction that is orthogonal to the row direction, in which only the third signal detection units are arranged in the vicinity of a pair line where plural pairs of the first signal detection unit and the second signal detection unit are arranged in the row direction, includes: a defocus amount generation step of calculating, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of third signal detection units is larger than the number of pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generating a defocus amount from the third correlation value; and a focusing control step of performing a focusing control for the imaging optical system based on the defocus amount generated in the defocus amount generation step.

INDUSTRIAL APPLICABILITY

The invention is applied to a digital camera or the like to provide high convenience and effectiveness.

EXPLANATION OF REFERENCES

1: imaging lens
2: diaphragm
5: imaging element
11: system control unit (focusing control unit)
19: phase difference AF processing unit (defocus amount generation unit, focusing degree determination unit)
50: imaging surface
51: pixel, imaging pixel (third signal detection unit)
52A, 52B: phase difference detection pixel (first signal detection unit, second signal detection unit)
53: AF area
X: row direction
Y: column direction

What is claimed is:

1. An imaging device comprising:
an imaging element that includes an imaging surface where a plurality of signal detection units including a first signal detection unit that detects a signal corresponding to a beam that passes through one divided region among divided regions of a pupil region of an imaging optical system divided in a row direction, a second signal detection unit that detects a signal corresponding to a beam that passes through the other divided region, and a third signal detection unit that detects a signal corresponding to beams that pass through the two divided regions are arranged in a two-dimensional pattern in the row direction and a column direction that is orthogonal to the row direction, in which only the third signal detection units are arranged in the vicinity of a pair line where plural pairs of the first signal detection unit and the second signal detection unit are arranged in the row direction;
a defocus amount generator that calculates, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of third signal detection units is larger than the number of pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generates a defocus amount from the third correlation value; and a focusing controller that performs a focusing control for the imaging optical system based on the defocus amount generated by the defocus amount generator.

2. The imaging device according to claim 1, wherein the imaging element is configured in which the first signal detection unit and the second signal detection unit that form the pair are arranged in different rows.

3. The imaging device according to claim 2, wherein the row including the third signal detection units of which the number is larger than the number of pairs is disposed between the row including the plurality of first signal detection units and the row including the plurality of second signal detection units.

4. The imaging device according to any one of claim 1, further comprising:
a focusing degree determiner that determines the degree of focusing of a main subject formed in a region including the pair line in the imaging surface,
wherein the defocus amount generator generates the defocus amount from the third correlation value in a case where it is determined by the focusing degree determiner that the degree of focusing is smaller than a threshold value, or generates the defocus amount from a correlation value between the detection signal group of the plurality of first signal detection units and the detection signal group of the plurality of second signal detection units in a case where it is determined by the focusing degree determiner that the degree of focusing is equal to or larger than the threshold value.

5. The imaging device according to any one of claim 2, further comprising:
a focusing degree determiner that determines the degree of focusing of a main subject formed in a region including the pair line in the imaging surface,
wherein the defocus amount generator generates the defocus amount from the third correlation value in a case where it is determined by the focusing degree determiner that the degree of focusing is smaller than a threshold value, or generates the defocus amount from a correlation value between the detection signal group of the plurality of first signal detection units and the detection signal group of the plurality of second signal detection units in a case where it is determined by the focusing degree determiner that the degree of focusing is equal to or larger than the threshold value.

6. The imaging device according to any one of claim 3, further comprising:
a focusing degree determiner that determines the degree of focusing of a main subject formed in a region including the pair line in the imaging surface,
wherein the defocus amount defocus amount generator generates the defocus amount from the third correlation value in a case where it is determined by the focusing degree determiner that the degree of focusing is smaller than a threshold value, or generates the defocus amount from a correlation value between the detection signal group of the plurality of first signal detection units and the detection signal group of the plurality of second signal detection units in a case where it is determined by the focusing degree determiner that the degree of focusing is equal to or larger than the threshold value.

7. The imaging device according to claim 4, wherein the defocus amount defocus amount generator makes the number of detection signals that form the detection signal group of the third signal detection units used in calculating the third correlation value become larger as the degree of focusing becomes lower.

8. The imaging device according to claim 5, wherein the defocus amount generator makes the number of detection signals that form the detection signal group of the third signal detection units used in calculating the third correlation value become larger as the degree of focusing becomes lower.

9. The imaging device according to claim 6, wherein the defocus amount generator makes the number of detection signals that form the detection signal group of the third signal detection units used in calculating the third correlation value become larger as the degree of focusing becomes lower.

10. A focusing control method of an imaging device according to claim 1, the method comprising:
a defocus amount generation step of calculating, through an operation using a detection signal group of the third signal detection units that are arranged in a row different from a row including the plurality of first signal detection units that forms the pair line and a row including the plurality of second signal detection units that forms the pair line and are arranged at the same pitch as an arrangement pitch of the pairs that form the pair line, in which the number of the third signal detection units is larger than the number of the pairs that form the pair line, a detection signal group of the plurality of first signal detection units and a detection signal group of the plurality of second signal detection units, a third correlation value corresponding to a value obtained by adding up a first correlation value between the detection signal group of the plurality of first signal detection units and the detection signal group of the third signal detection units and a second correlation value between the detection signal group of the plurality of second signal detection units and the detection signal group of the third signal detection units, and generating a defocus amount from the third correlation value; and
a focusing control step of performing a focusing control for the imaging optical system based on the defocus amount generated in the defocus amount generation step.

* * * * *